United States Patent
Sharma (10) Patent No.: US 12,407,889 B2
(45) Date of Patent: *Sep. 2, 2025

(54) DYNAMIC LOW LATENCY MODE FOR A DIGITAL VIDEO PRODUCTION SYSTEM

(71) Applicant: DISH Network Technologies India Private Limited, Karnataka (IN)

(72) Inventor: S A Varun Hrishikesh Sharma, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,154

(22) Filed: Sep. 20, 2023

(65) Prior Publication Data

US 2024/0015043 A1 Jan. 11, 2024

Related U.S. Application Data

(63) Continuation of application No. 16/731,869, filed on Dec. 31, 2019, now Pat. No. 11,784,839.

(51) Int. Cl.
*H04N 21/4223* (2011.01)
*H04L 12/18* (2006.01)
*H04L 65/70* (2022.01)

(52) U.S. Cl.
CPC ..... *H04N 21/4223* (2013.01); *H04L 12/1827* (2013.01); *H04L 12/1831* (2013.01); *H04L 12/189* (2013.01); *H04L 65/70* (2022.05)

(58) Field of Classification Search
None
See application file for complete search history.

(56) References Cited

U.S. PATENT DOCUMENTS

| | | | |
|---|---|---|---|
| 2008/0267069 A1* | 10/2008 | Thielman | H04N 7/15 348/E7.083 |
| 2009/0019505 A1 | 1/2009 | Gopalakrishnan et al. | |
| 2010/0166058 A1 | 7/2010 | Perlman et al. | |
| 2010/0296571 A1* | 11/2010 | El-Saban | H04N 21/21805 375/E7.026 |

(Continued)

FOREIGN PATENT DOCUMENTS

| | | | | |
|---|---|---|---|---|
| WO | WO-2013091010 A1 * | 6/2013 | | H04N 21/2187 |
| WO | 2014043405 A1 | 3/2014 | | |
| WO | 2016068760 A1 | 5/2016 | | |

*Primary Examiner* — Ario Etienne
*Assistant Examiner* — Mohammad Yousuf A. Mian
(74) *Attorney, Agent, or Firm* — KW Law, LLP (57) ABSTRACT

Systems, devices and processes and described herein to improve the generation of video content in video production systems. In general, the systems, devices and processes facilitate the incorporation of one or more remotely captured video streams into an output video stream for use in video conferencing. Specifically, the systems, devices and processes provide for the use of a dynamically adjustable time clock delay to generate a relatively low latency output video stream suitable for use in video conferencing. The use of dynamically adjustable time clock delay allows one or more input video streams to be generated by one or more remote video-capture devices, transmitted to a video access point device, and selectively combined at the video access point device into the output video stream with relatively low latency suitable for video conferencing.

20 Claims, 4 Drawing Sheets

(56) References Cited

U.S. PATENT DOCUMENTS

| | | |
|---|---|---|
| 2012/0092443 A1 | 4/2012 | Mauchly |
| 2013/0128735 A1 | 5/2013 | Li et al. |
| 2015/0121436 A1* | 4/2015 | Rango .................... G11B 27/34 |
| | | 725/88 |
| 2016/0248650 A1 | 8/2016 | Galime |
| 2016/0345035 A1* | 11/2016 | Han ................. H04N 21/21805 |
| 2017/0070547 A1 | 3/2017 | Falk et al. |
| 2017/0289646 A1 | 10/2017 | Newpol et al. |
| 2017/0332131 A1 | 11/2017 | Opsenica et al. |
| 2019/0045140 A1 | 2/2019 | Marcovici et al. |
| 2019/0190804 A1* | 6/2019 | Tang ................... H04L 43/0852 |
| 2019/0356897 A1* | 11/2019 | Karivaradaswamy ...................... |
| | | H04N 13/139 |
| 2020/0186575 A1* | 6/2020 | Rofe .................... H04L 65/765 |

\* cited by examiner

DYNAMIC LOW LATENCY MODE FOR A DIGITAL VIDEO PRODUCTION SYSTEM

CROSS-REFERENCE TO RELATED APPLICATIONS

This application claims priority to U.S. patent application Ser. No. 16/731,869 filed on Dec. 31, 2019, entitled "DYNAMIC LOW LATENCY MODE FOR A DIGITAL VIDEO PRODUCTION SYSTEM," which is incorporated herein by reference for any purpose.

TECHNICAL FIELD

The following discussion generally relates to the production of digital video programming. More particularly, the following discussion relates to the creation of digital video programming with low latency.

BACKGROUND

Recent years have seen an explosion in the creation and enjoyment of digital video content. Millions of people around the world now carry mobile phones, cameras or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

More recently, video production systems have been created that allow groups of relatively non-professional users to capture one or more video feeds, to select one of the video feeds for an output stream, and to thereby produce a professional-style video of the output stream for viewing, sharing, publication, archiving and/or other purposes. Many of these systems rely upon Wi-fi, Bluetooth and/or other wireless communications for sharing of video feeds, control instructions and the like.

Recently there has been a desire to use such video production systems in video conferencing. Unfortunately, because these video production systems enable the use multiple video feeds from multiple devices they have previously required relatively high latencies in the final output stream. While these high latencies are acceptable for some video production applications, they are undesirable when producing video for use in a video conferencing. Specifically, these high latencies can make communication between participants over video conferencing difficult. Thus, there remains a continuing desire to create systems and methods that improve video production from multiple video feeds for use in video conferencing. Other desirable features and characteristics will become apparent from the subsequent detailed description and the appended claims, taken in conjunction with the accompanying drawings and this background section.

BRIEF SUMMARY

Various embodiments provide systems, devices and processes to improve the generation of video content in video production systems. In general, the systems, devices and processes facilitate the incorporation of one or more remotely captured video streams into an output video stream for use in video conferencing. Specifically, the systems, devices and processes provide for the use of a dynamically adjustable time clock delay to generate a relatively low latency output video stream suitable for use in video conferencing. More specifically, the use of the dynamically adjustable time clock delay allows one or more input video streams to be generated by one or more remote video capture devices, transmitted to a video access point device, and selectively combined at the video access point device into the output video stream with relatively low latency suitable for video conferencing.

Specifically, in one embodiment a plurality of input video streams are received at a video access point device. A plurality of measures of video latency is then calculated, with each of the measures of video latency corresponding to one of the plurality of input video streams received at the video access point device. A time clock delay is then implemented based at least in part on the plurality of measures of video latency. A conferencing video stream is then generated from the received input video streams using the time clock delay. In such an embodiment the use of the time clock delay implemented based at least in part on the plurality of measures of video latency can provide several distinct improvements. Specifically, by basing the time clock delay at least in part on the measures of video latency the time clock delay can be dynamically adjusted to provide a relatively low latency suitable for video conferencing. Thus, the output video stream can be generated to include all or part of multiple input video streams generated by one or more remote video capture devices while still providing a relatively low latency suitable for video conferencing.

A first example embodiment provides an automated process executable by a video access point device that produces a conferencing video. The automated process suitably comprises: receiving a plurality of input video streams at the video access point device; calculating a plurality of measures of video latency, each of the plurality of video latencies corresponding to one of the plurality of input video streams received at the video access point device; implementing a time clock delay based at least in part on the plurality of measures of video latency; and generating a conferencing video from the received plurality of input video streams using the time clock delay.

A further example may comprise determining a maximum video latency of the plurality of measures of video latency and implementing the time clock delay based at least in part on the maximum video latency.

A further example may comprise adding a margin value to the maximum video latency to determine the time clock delay.

A further example may comprise implementing the time clock delay based at least in part on the maximum video latency comprises not exceeding a predetermined maximum time clock delay.

A further example may comprise not exceeding a selected one of a plurality of predetermined maximum time clock delay parameters, wherein the selected one is based on selected latency mode.

A further example may comprise the plurality of input video streams each transmitted from one of a plurality of video capture devices.

A further example may comprise generating a timestamp from a system time clock at the video access point device, and transmitting the timestamp from the video access point device to a plurality of video capture devices.

A further example may comprise encoding the plurality of input video streams at the plurality of video capture devices using the transmitted timestamp.

A further example may comprise utilizing the timestamp encoded with each of the plurality of input video streams.

A further example may comprise calculating an amount of video latency for a predetermined percentage of packets arriving at the video access point device for each of the plurality of input video streams.

A further example may comprise compositing the conferencing video using the time clock delay applied to a system time clock on the video access point device.

Another embodiment provides a video access point device comprising a processor and a memory, wherein the processor is configured to perform an automated process by executing digital instructions stored in the memory, wherein the automated process. The automated process suitably comprises: receiving a plurality of input video streams at the video access point device; calculating a plurality of measures of video latency, each of the plurality of video latencies corresponding to one of the plurality of input video streams received at the video access point device; implementing a time clock delay based at least in part on the plurality of measures of video latency; and generating a conferencing video from the received plurality of input video streams using the time clock delay A further example may comprise determining a maximum video latency of the plurality of measures of video latency and implementing the time clock delay based at least in part on the maximum video latency.

A further example may comprise adding a margin value to the maximum video latency to determine the time clock delay.

A further example may comprise not exceeding a predetermined maximum time clock delay.

A further example may comprise not exceeding a selected one of a plurality of predetermined maximum time clock delay parameters, wherein the selected one is based on selected latency mode.

A further example may comprise: generating a timestamp from a system time clock at the video access point device, and transmitting the timestamp from the video access point device to a plurality of video capture devices; encoding the plurality of input video streams at the plurality of video capture devices using the transmitted timestamp; and wherein calculating the plurality of measures of video latency comprises utilizing the timestamp encoded with each of the plurality of input video streams.

A further example may comprise calculating an amount of video latency for a predetermined percentage of packets arriving at the video access point device for each of the plurality of input video streams.

A further example may comprise using the time clock delay comprises compositing the conferencing video using the time clock delay applied to a system time clock on the video access point device.

Another example embodiment provides an automated process executable by a video access point device that produces a conferencing video stream. The automated process suitably comprises: generating a timestamp with a system time clock at the video access point device; transmitting the timestamp to the plurality of video capture devices; encoding a video stream at each of the plurality of video capture devices using the transmitted timestamp to generate a plurality of input video streams; transmitting the plurality of encoded input video streams from the plurality video capture devices; receiving the plurality of input video streams at the video access point device; calculating a plurality of measures of video latency utilizing the timestamp encoded with each of the plurality of input video streams, each of the plurality of measures of video latency corresponding to one of the plurality of input video streams received at the video access point device; determining a maximum video latency of the plurality of measures of video latency; dynamically implementing a time clock delay based at least in part on the maximum video latency of the plurality of measures of video latency by adding a margin value to the maximum video latency while also not exceeding a predetermined maximum time clock delay; and generating a conferencing video stream using one or more of the plurality of input video streams received at the video access point device by compositing the conferencing video using the time clock delay of the system time clock to determine which video frames from the one or more of the plurality of input video streams are included in the conferencing video stream Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

Various embodiments provide systems, devices and processes to improve the generation of video content in video production systems. In general, the systems, devices and processes facilitate the incorporation of one or more remotely captured video streams into an output video stream for use in video conferencing. Specifically, the systems, devices and processes provide for the use of a dynamically adjustable time clock delay to generate an output video stream with a relatively low latency suitable for use in video conferencing.

More specifically, the use of dynamically configurable time clock delay allows one or more input video streams to be generated by one or more remote video capture devices, transmitted to a video access point device, and selectively combined at the video access point device into the output video stream with relatively low latency suitable for video conferencing.

In one embodiment a plurality of input video streams are received at a video access point device. A plurality of measures of video latency is then calculated, with each of the measures of video latency corresponding to one of the plurality of input video streams received at the video access point device. A time clock delay is then implemented based at least in part on the plurality of measures of video latency. A conferencing video stream is then generated from the received input video streams using the time clock delay.

In such an embodiment the use of the time clock delay implemented based at least in part on the plurality of measures of video latency can provide several distinct improvements. Specifically, by basing the time clock delay at least in part on the measures of video latency the time clock delay can be dynamically adjusted to provide a relatively low latency suitable for video conferencing. Specifically, as the measures of video latency of the input video streams received from the video capture devices change over time, the time clock delay can be adjusted accordingly. This facilitates the generation of an output video stream with minimized latency. Thus, the output video stream can be generated to include all or part of multiple input video streams generated by one or more remote video capture devices while still providing a relatively low latency suitable for video conferencing.

The general concepts described herein may be implemented in any video production context, especially the capture and encoding or transcoding of live video. For convenience of illustration, the following discussion often refers to a video production system in which one or more live video streams are received from one or more cameras or other capture devices via a wireless network to produce an output video stream for publication or other sharing. Equivalent embodiments could be implemented within other contexts, settings or applications as desired.

Figure 1:
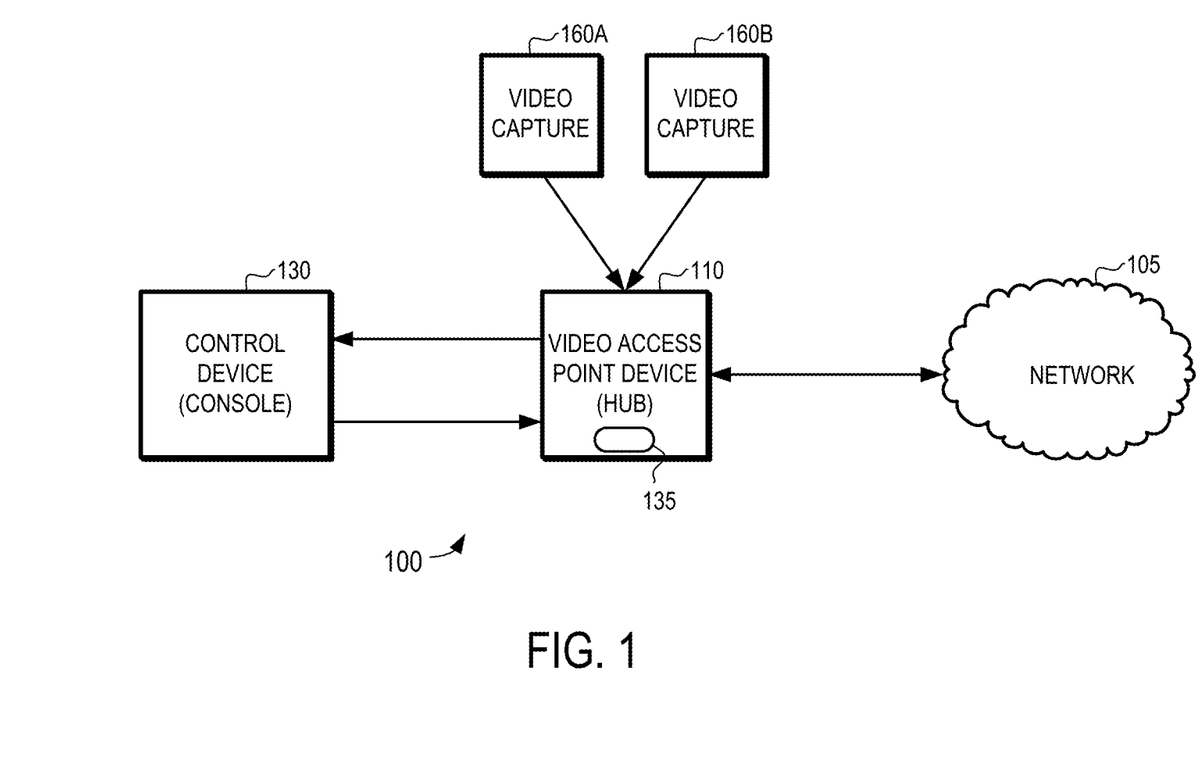
FIG. 1 is a diagram of an example video production system.

Turning now to the drawings and with initial reference to FIG. 1, a video production system 100 suitably includes a video access point device 110 and a control device 130. The video access point device 110 is in communication with video capture devices 160A-B and a network 105.

The video capture devices 160A-B can each be any type of camera or other device capable of generating video content and transmitting that video content in the form a video stream to the video access point device 110. Several examples of such video capture devices 160A-B will be described below. Furthermore, it should be noted that while FIG. 1 illustrates two video capture devices 160A-B that more or fewer video capture devices can be used.

In general, the video access point device 110 is implemented to receive input video streams from the video capture devices 160A-B and selectively process video data from those input video streams to generate an output video stream. For example, the video access point device 110 can be implemented to suitably mix, composite and/or encode one or more the input video streams into an appropriate format for distribution as an output video stream. To facilitate this, the video access point device 110 can be implemented to include a wide range of video processing, compositing, encoding and transmitting capabilities. The output video stream can then be transmitted to a video conferencing service via the network 105. In some embodiments the output video stream can also stored (e.g., as a data file on the video access point device 110 or some external storage) and/or transmitted via the network 105 to an internet based hosting or distribution service, such as YouTube, Facebook, Ustream, Twitch, Mixer and/or the like.

To provide this functionality the video access point device 110 can be implemented to communicate with video capture devices 160A-B wirelessly (e.g., through a Wi-Fi connection using IEEE 802.11 protocols) or a wired connection (e.g., High-Definition Multimedia Interface (HDMI)). The video access point device 110 also can be implemented to communicate with the network 105 via a wired or wireless connection.

In general, the control device 130 is implemented facilitate user control of the video access point device 110. As such the control device 130 is implemented to receive user inputs and communicate appropriate instructions to the video access point device 110. To facilitate this, the control device 130 is implemented to receive one or more video streams received from the video access point device 110, including input video streams originally generated by the video capture devices 160A-B. Furthermore, the control device 130 would include a user interface that is implemented to allow the user to control the operation of the control device 130 and the operation of the video access point device 110. For example, the user interface can include a display device implemented to simultaneously display one or more the video streams received from the video capture devices 160A-B. This user interface can further allow a user to select which of the video streams received from the video capture devices 160A-B are to be encoded into the output video stream by the video access point device 110.

The control device 130 can be implemented with any suitable computing device, including laptops, tablets and mobile communication devices (e.g., smart phones). In one suitable implementation the control device 130 is implemented with an application being executed on a device that includes a touch screen. In such an embodiment the touch screen can be implemented to receive user commands and display one or more of the various video streams received from the video access point device 110. However, it should be noted that such a touch screen implementation is just one example, and other implementations are possible.

Typically, the control device 130 would be implemented with one or more suitable processors and memory devices to execute a control application for communicating with and controlling the operation of the video access point device 110. The control device 130 can be implemented to communicate with the video access point device 110 using any suitable technique, including wireless (e.g., Wi-Fi) and wired networks. Furthermore, while FIG. 1 shows the control device 130 communicating with the video access point device 110 separately from the video capture devices 160A-B, in practice the same Wi-Fi could be used if sufficient bandwidth is available. Other embodiments may use any other network configuration desired, including any number of additional or alternate networks or other data links.

In accordance with the embodiments described herein the video access point device 110 facilitates the incorporation of one or more remotely captured video streams from video capture devices 160A-B into an output video stream for use in video conferencing. Specifically, the video access point device 110 provides for the use of a dynamically configurable time clock delay 135 to generate an output video stream with a relatively low latency suitable for use in video conferencing.

More specifically, the use of dynamically configurable time clock delay 135 allows one or more input video streams to be generated by one or more remote video capture devices 160A-B, transmitted to the video access point device 110, and selectively utilized at the video access point device 110 to generate an output video stream with relatively low latency suitable for video conferencing. This low latency video stream can then be transmitted to other members of the video conference via a video conferencing service or other equivalent technique. For example, the low latency video stream can then be transmitted to a video conference service via the network 105, where the video stream can then be transmitted to be other parties on the video conference. The low latency video stream can also be transmitted to the control device 130 or other display device for display to the user of those devices.

In one embodiment the video access point device 110 includes a system time clock that is used to synchronize the input video streams generated by the plurality of video capture devices 160A-B. Specifically, because the video access point device 110 receives multiple input video streams from multiple different sources (e.g., video capture devices 160A-B), it is possible that each of these different input video streams could be subject to different buffering and transmission delays and thus be unsynchronized when received at the video access point device 110. For example, if two video capture devices 160A-B were both recording video of a running stopwatch the two resulting input video streams as received at the video access point device 110 could show the stopwatch out of sync, i.e., with different times on the stopwatch shown in the different videos. It is naturally undesirable for such input video streams to be unsynchronized when they are being selectively combined to generate an output video stream by the video access point device 110.

Thus, in some embodiments the video access point device 110 includes a system timeclock that can facilitate synchronization of the input video streams received from the video capture devices 160A-B. In one embodiment, the system time clock is used to periodically generate a timestamp. That timestamp can then be transmitted to the various video capture devices 160A-B, where the timestamp can then be used to encode the input videos streams. Because each of the video capture devices 160A-B is then using the same timestamp to encode its video stream, each input video stream will have the same time reference when transmitted to the video access point device 110.

When the input video streams are transmitted from the video capture devices 160A-B to the video access point device 110, the video access point device 110 will synchronize the input video streams using the encoded timestamps and the system time clock. However, because of the time needed to encode and transmit the input video streams from the video capture devices 160A-B to the video access point device 110, and further process those input video streams at the video access point device 110, the input video streams cannot be directly synchronized with the system time clock.

Instead, it is needed to introduce a delay in the system time clock at the video access point device 110 to facilitate synchronization of the received input video streams. Again, this delay accounts for the time needed to transmit, receive and process the input video streams at the video access point device 110. Thus, by introducing a delay in the system time clock the video access point device 110 can then synchronize and process the received input video streams with the delayed system time clock. And in accordance with the embodiments described herein, this delay in the system time clock will be provided using a dynamically adjustable time clock delay.

In one embodiment a plurality of input video streams generated by a plurality of video captures devices 160A-B are received at a video access point device 110. A plurality of measures of video latency is then calculated, with each of the measures of video latency corresponding to one of the plurality of input video streams received at the video access point device 110. A time clock delay 135 is then implemented based at least in part on the plurality of measures of video latency. A conferencing video stream is then generated from the received input video streams using the time clock delay 135. For example, the conferencing video stream can then be generated by compositing the conferencing video using the time clock delay of the system time clock to determine which video frames from the one or more of the plurality of input video streams are included in the conferencing video stream.

In such an embodiment the use of the time clock delay 135 implemented based at least in part on the plurality of measures of video latency can provide several distinct improvements. Specifically, by basing the time clock delay 135 at least in part on the measures of video latency the time clock delay can be dynamically adjusted to provide a relatively low latency suitable for video conferencing. Specifically, as the measures of video latency of the input video streams received from the video capture devices change over time, the time clock delay 135 can be adjusted accordingly. This facilitates the generation of an output video stream by the video access point device 110 with minimized latency. Thus, the output video stream can be generated to include all or part of multiple input video streams generated by one or more remote video capture devices while still providing a relatively low latency suitable for video conferencing.

In one embodiment, implementing the time clock delay 135 based at least in part on the plurality of measures of video latency comprises determining a maximum video latency of the plurality of measures of video latency and implementing the time clock delay 135 based at least in part on the maximum video latency. For example, the time clock delay 135 can be implemented as the determined maximum video latency of the input video sources plus a selected margin value, where the margin value provides an extra margin of time for encoding and/or compositing the input video sources into the output video stream for video conferencing. Detailed examples of such embodiments will be described in greater detail below with reference to FIG. 3.

In another embodiment, implementing the time clock delay 135 based at least in part on the plurality of measures of video latency comprises implementing the time clock delay 135 to not exceed a predetermined maximum time clock delay. And in one additional variation a plurality of predetermined maximum clock delays can be provided and selected based on a selected latency mode.

In one embodiment, a timestamp is generated using a system time clock at the video access point device 110. The timestamp is then transmitted from the video access point device 110 to the plurality of video capture devices 160A-B. Each of the video capture devices 160A-B can then use the timestamp to encode its input videos stream. When these input video streams are transmitted to the video access point device 110 these encoded timestamps can then be used by the video access point device 110 to calculate the measure of video latency for each of the plurality of input video streams. Those measures of video latency can then be used to configure the time clock delay 135 with one or more parameters that set a maximum time delay that is allowed by the time clock delay 135.

In one embodiment, the calculating of the measure of video latency for each of the plurality of input video streams received at the video access point device 110 is performed by calculating an amount of video latency for which a predetermined percentage of video data packets arrives at the video access point device 110. Details of such an embodiment will be discussed down below with reference to FIG. 3.

The video production system 100 thus facilitates the incorporation of one or more remotely captured video streams from video capture devices 160A-B into an output video stream for use in video conferencing. Specifically, the video access point device 110 provides for the use of a dynamically configurable time clock delay 135 that allows one or more input video streams to be generated by one or more remote video capture devices 160A-B, transmitted to the video access point device 110, and selectively utilized at the video access point device 110 to generate an output video stream with relatively low latency suitable for video conferencing. This low latency video stream can then be transmitted via network 105 to other members of the video conference via a video conferencing service or other equivalent technique.

Figure 2:
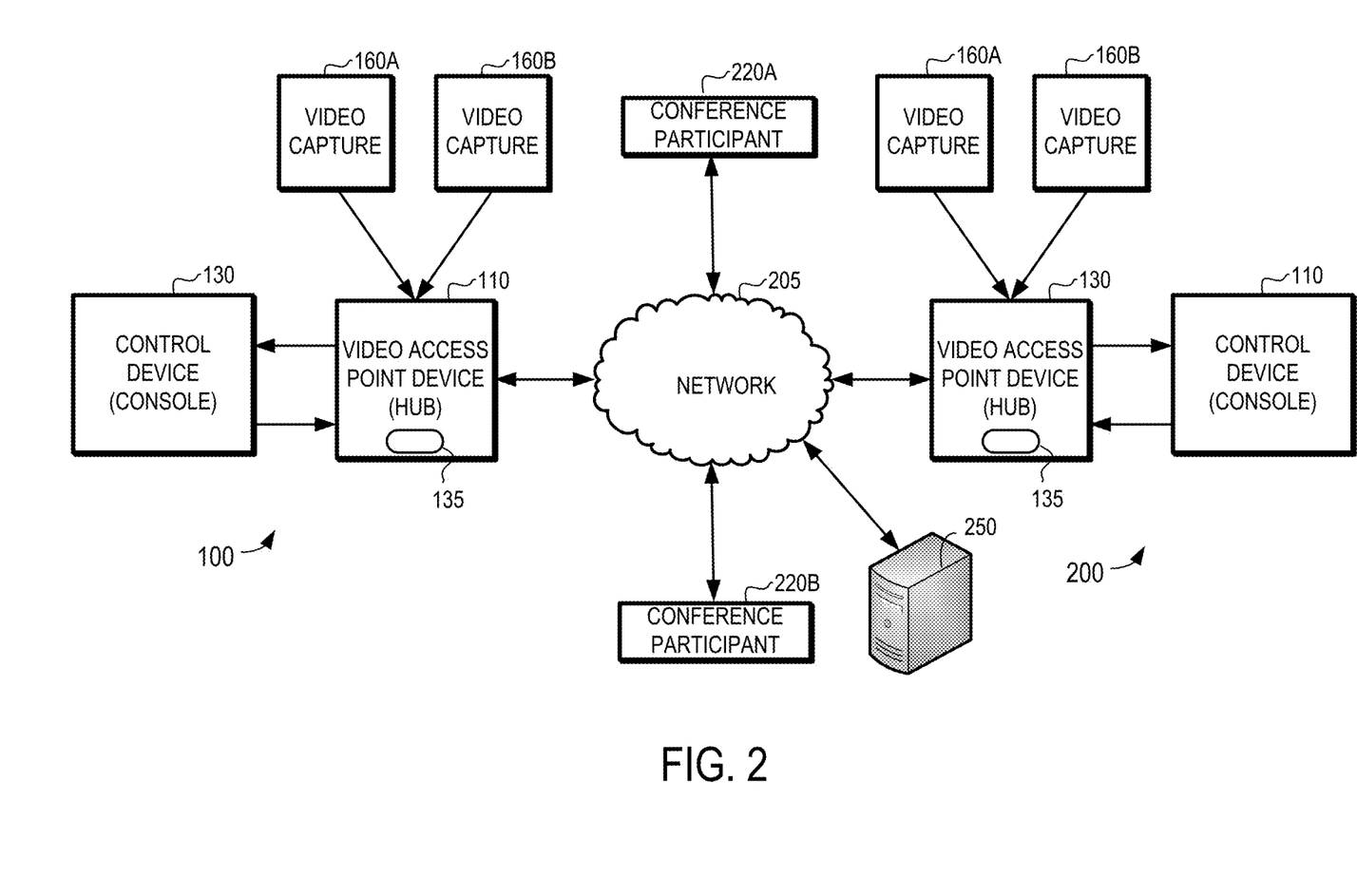
FIG. 2 is a diagram of multiple video production systems and conference participants connected via a network.

Turning now to FIG. 2, an example use case of the video production system 100 is illustrated with a second video production system 200 and two additional video conference participants 220A-B. The video production system 100, second video production system 200, and video conference participants 220A-B are in communication with a video conferencing service 250 through the network 205. In this case both the video production system 100 and second video production system 200 can generate output video streams suitable for video conferencing both with each other and the other conference participants 22oA-B using the video conferencing service 250.

Figure 3:
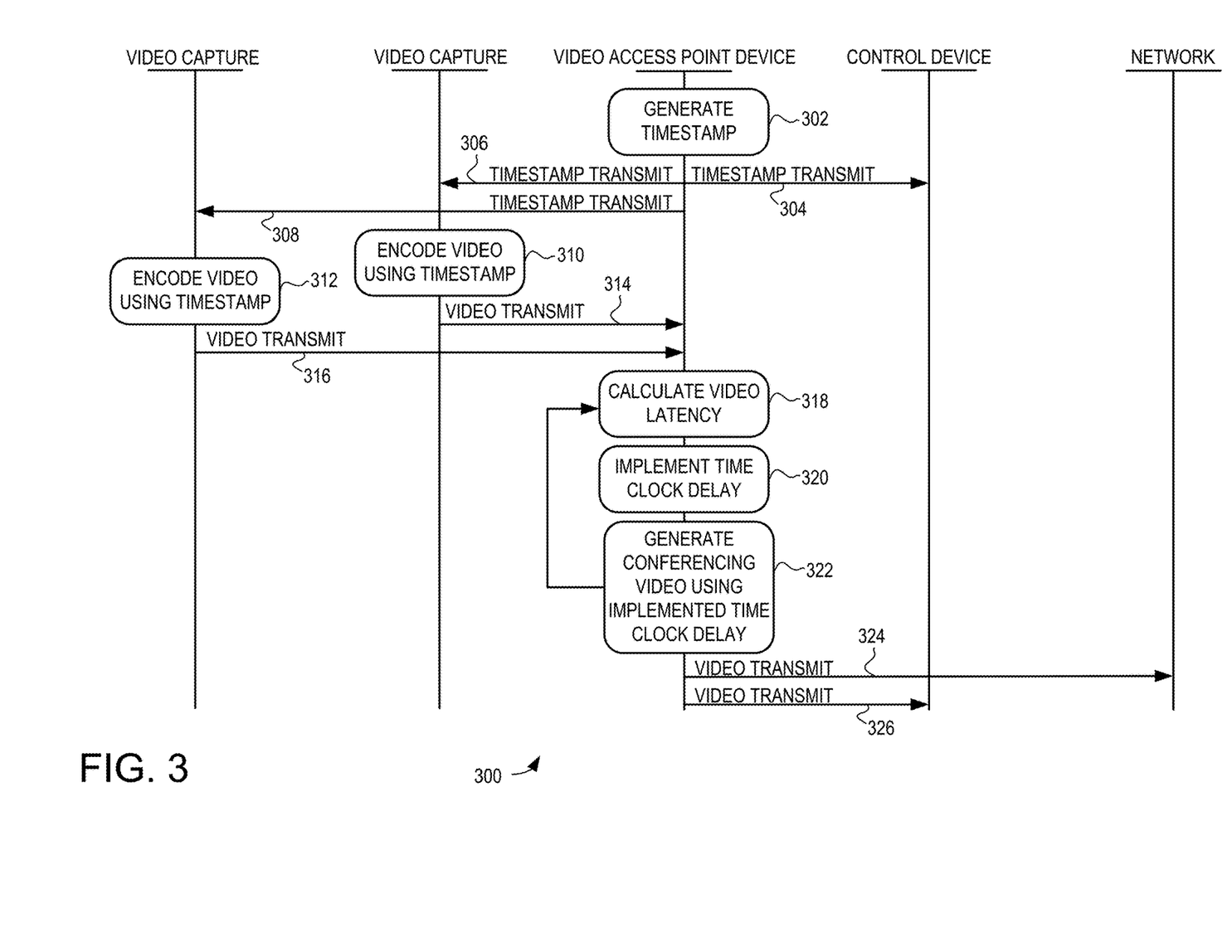
FIG. 3 is a flowchart showing various processes executable by devices operating within a video production system.

Turning now to FIG. 3, a process flow diagram 300 illustrates various example processes and data flows that can be automatically executed by video capture devices (e.g., video capture devices 160A-B), video access point devices (e.g., video access point device 110), and control devices (e.g., control devices 130).

To facilitate the process, communications between the various devices and networks can be initiated and established in any suitable manner. For example, communication between the various devices and networks may be established using wireless protocols (e.g., Wi-Fi) or wired systems (e.g., Ethernet or HDMI). It should also be noted that communication between the control device and the video access point device may be established over the same network as communication between video capture devices and the video access point device.

At process step 302 video access point device generates a timestamp. This timestamp can be generated using a system time clock on the video access point device or in any other suitable manner. As will be described in greater detail below, the timestamp can be used as a common time reference to determine a measure of latency for the plurality of input video streams received from the video capture devices. To facilitate this, the timestamp is transmitted to the video capture devices using transmit functions 306 and 308. Additionally, the timestamp can be transmitted to the control device using the transmit function 304. In one embodiment, the timestamp is generated using a suitable clock function and transmitted using a suitable remote procedure call.

With the timestamp generated and transmitted to the video capture devices, the video capture devices at process steps 310 and 312 encode their respective captured videos using the timestamp and then transmit the encoded videos to the video access point device with video transmit functions 314 and 316. These videos are received at the video access point device as input video streams.

At process step 318 the video access point device calculates a measure of video latency for each of the input video streams received via the video transmit functions 314 and 316. Specifically, the video access point device uses the encoded timestamps to calculate the measure of video latency for each input stream of the plurality of input video streams. In general, this measure of video latency represents the time delay from when the input video was captured at the capture devices to when the resulting input video stream was received at the video access point device. Thus, the measure of the video latency describes how long the video capture devices take to process and transmit the video to the video access point device.

Because the transmission of video data typically results in some small percentage of video data being delayed or lost it can be desirable to base the measure of video latency on the time in which a predetermined percentage of data packets or video frames arrive at the video access point device. Thus, in one embodiment, the calculating of the measure of video latency for each of the plurality of input video streams received at the video access point device is performed by calculating an amount of video latency for which a predetermined percentage of video data packets or video frames arrives at the video access point device.

In another embodiment, the video latency is calculated for every video frame, and if the time delay is consistent approximately for a set number of video frames to avoid setting the clock delay too frequently. For example, if the video latency is consistent for 5 consecutive video frames, the time clock delay may be set only for every $5^{th}$ video frame to avoid setting it too frequently for every video frame.

In any such embodiment the video latency can be calculated by determining the difference between the current system time clock and the encoded timestamp on the incoming video frame. Thus, if video frames from one video capture device consistently arrive at the video access point device within 165 milliseconds, then 165 milliseconds can be the calculated measure of video latency for that input video stream. Likewise, if video frames arrive within 195 milliseconds, then 195 milliseconds will be the calculated measure of latency for that input video stream.

At process step 320 the video access point device implements a time clock delay based at least in part on the measure of video latency for each of the plurality of input video streams received at the video access point device. As will be described in greater detail below, this time clock delay is used to process the input video streams to generate to an output video stream for video conferencing. For example, the time clock delay facilitates synchronization of the received input video streams by compensating for the time needed to transmit, receive and process the input video streams at the video access point device.

To facilitate this, the time clock delay is preferably implemented to ensure that the period allowed by the time clock delay is large enough to accommodate the video capture device with the highest latency, but also that the delay period is not larger than needed.

In one embodiment, implementing the time clock delay based at least in part on the plurality of measures of video latency comprises determining a maximum video latency of the plurality of measures of video latency and implementing the time clock delay based at least in part on the maximum video latency.

For example, assume a video production system with video access point device (e.g., video access point device 110) and four video capture devices (e.g., video capture devices 160A, B, C and D). And in this example a measure of latency of these four video capture devices is determined as follows:

TABLE 1

| Video Capture Device | Measure of Video Latency |
| --- | --- |
| 160A | 165 milliseconds |
| 160B | 175 milliseconds |

TABLE 1-continued

| Video Capture Device | Measure of Video Latency |
| --- | --- |
| 160C | 190 milliseconds |
| 160D | 175 milliseconds |

In the example of Table 1, the maximum video latency of the plurality of measures of video latency is 190 milliseconds. Thus, in this example the time clock delay can initially be set at 190 milliseconds in process step 320.

As another, the time clock delay can be implemented as the determined maximum video latency of the input video sources plus a selected margin value, where the margin value provides an extra margin of time for output video composition for video conferencing. As one example implementation, such a margin value can be set at 5 milliseconds. Then applying this example to the example given above in Table 1, the resulting time clock delay value for would be 195 milliseconds (i.e., 190+5 milliseconds).

In another embodiment, implementing the time clock delay based at least in part on the plurality of measures of video latency comprises implementing the time clock delay to not exceed a predetermined maximum time clock delay. In such an embodiment the time clock delay will not be set greater than the predetermined maximum time clock delay regardless of the measure of video latency. Instead, the time clock delay would set to this predetermined maximum value.

In one additional variation on this embodiment, a plurality of predetermined maximum time clock delays can be provided and selected from based on a selected latency mode. As one example implementation of an embodiment with a plurality of maximum time clock delays, a low latency mode can be provided with a predetermined maximum time clock delay of 350 milliseconds, and an ultra-low latency mode can be provided with a predetermined maximum time clock delay of 175 milliseconds. In such an embodiment the time clock delay will not be set greater than the predetermined maximum time clock delay for the current mode regardless of the measure of video latency. Instead, the time clock delay would set to this predetermined maximum value for the current mode.

In some implementations of this embodiment the user of the video production system can then select between modes as desired. In the other implementations the video production system could be configured to switch between modes automatically based on other operational parameters.

Applying this example to the example of Table 1 would result in a time clock delay value of 190 milliseconds for low latency mode, and 175 milliseconds in ultra-low latency mode. Again it should be noted that this is just one example and other implementations are possible.

At process step 322 the video access point device generates a conferencing video from the received input video streams using the implemented time clock delay. In general, this step can be performed processing one or more the received input video streams and compositing the output video stream for video conferencing using the implemented time clock delay on the system time clock. For example, the time clock delay can be used in compositing the conferencing video by using the time clock delay of the system time clock to determine which video frames from the one or more of the plurality of input video streams are included in the conferencing video stream. In this example, the implemented time clock delay determines an "acceptable delay" for processing video frames from the input video streams.

For example, if the time clock delay is set at 190 ms, then input video frames that are arriving at the video access point between 0-190 ms are considered valid for compositing, while output video frames arriving after 190 ms would not be.

It should be noted that so implemented and used to generate the output video stream, the time clock delay effectively filters out input video data that arrives outside time period specified by the delay. Thus, rather than waiting for late arriving video data beyond the specified time clock delay, the video access point device generates the output video stream with incomplete video data. For example, the video access point device can drop video frames for which all the video data has not arrived in the time provided by the time clock delay. Alternatively, the video access point device can reuse previously received video data from prior frames in place of the late arriving video data for the new frame.

In such an embodiment, the time clock delay effectively defines a time window that determines which video data is included in the conferencing video and which are not.

It should be noted that because of the possibility of dropped or incomplete frames this process can result in reduced video quality. However, this is typically acceptable for video conferencing because high video quality is generally less important in video conferencing than low latency. Thus, the use of the time clock delay can provide the more important benefit of ensuring that the generated conferencing video has the desired low latency needed for video conferencing.

Process step 322 can include a variety of types of video processing. For example, the video access point device can be implemented to suitably mix and compose one or more the input video streams into an appropriate format for distribution as an output video stream suitable for video conferencing. In one specific embodiment this process step 322 is implemented using the using any suitable audio and video composition function.

With the output video stream generated, the transmit function 324 transmits the output video stream via the network. For example, the transmit function 324 can transmit the output video stream as a conferencing video to a video conference service (e.g., Skype, Zoom, WebEx, etc.). The transmit function 325 can likewise transmit the output video stream to the control device for viewing by the user of the control device. Finally, the output video stream may then be stored as a file on an external storage (e.g., a memory card, hard drive or other non-volatile storage) and/or uploaded to a hosting or distribution service operating on the Internet or another network.

In some embodiments all or part of the process flow illustrated in FIG. 3 is repeatedly performed. For example, in some embodiments, process steps 318, 320, and 322 are repeated to continuously calculate video latency and update the time clock delay as needed. For example, these steps can be repeated at predetermined time intervals or number of frames (e.g., between every 3 and 15 frames). As a specific example, the process steps can be repeated every $5^{th}$ frame. In other embodiments the entire process flow as illustrated in diagram 300 is periodically repeated. Again, the process flow can be repeated at predetermined time intervals or number of frames. In either case this allows the time clock delay to be dynamically adjusted and set to most appropriate value that balances video quality with low latency.

The process flow illustrated in FIG. 3 can again provide several distinct improvements. Specifically, the process flow provides for the use of a dynamically configurable time clock delay to generate a relatively low latency output video stream suitable for use in video conferencing. Specifically, as the measures of video latency of the input video streams received from the video capture devices change over time, the time clock delay can be adjusted accordingly. This facilitates the generation of an output video stream with minimized latency. More specifically, the use of dynamically configurable time clock delay allows one or more input video streams to be generated by one or more remote video capture devices, transmitted to a video access point device, and selectively combined at the video access point device into the output video stream with relatively low latency suitable for video conferencing. Finally, it should be noted that FIG. 3 illustrates only one potential embodiment, and that other embodiments may be organized to execute in any other manner, with the various functions and messages shown in FIG. 3 being differently organized and/or executed by other devices, as appropriate.

Figure 4:
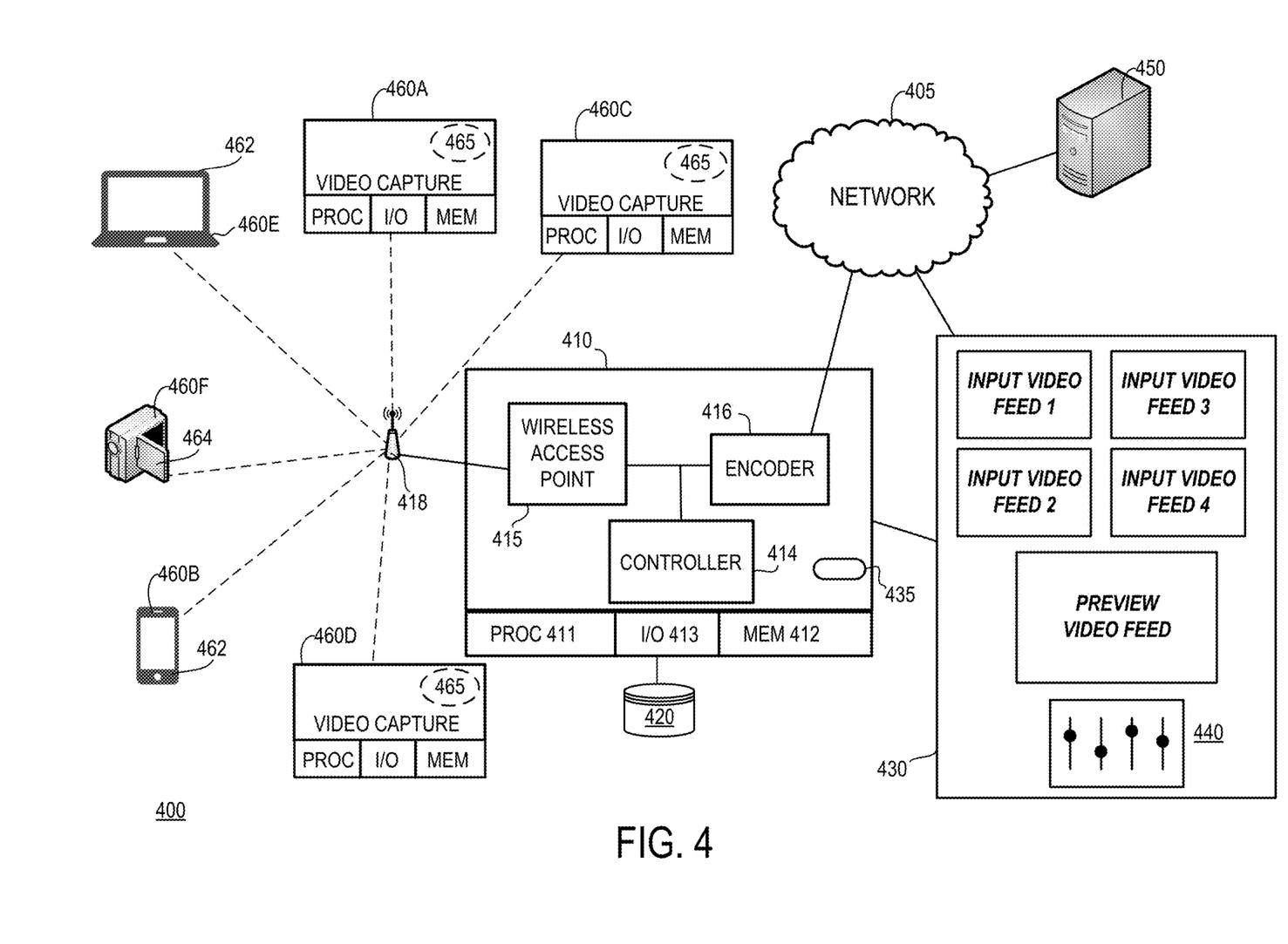
FIG. 4 is a detailed diagram of one example implementation of a video production system.

Turning now to FIG. 4, a more detailed example of a video production system 400 is illustrated. In accordance with the embodiments described herein, the video production system 400 is implemented to facilitate the incorporation of one or more remotely captured video streams from video capture devices into an output video stream for use in video conferencing. Specifically, the video production system 400 provides for the use of a dynamically configurable time clock delay to generate an output video stream with a relatively low latency suitable for use in video conferencing.

The video production system 400 can be used to produce a video program based upon selected videos from multiple input video feeds. To facilitate this, the video production system 400 includes a video access point device 410 and a control device 430. In the illustrated example, the video access point device 410 provides a wireless access point and appropriate encoding/compositing hardware to process video programming based upon instructions received from the control device 430. The encoded video program may be initially stored as a file on an external storage 420 (e.g., a memory card, hard drive or other non-volatile storage) for eventual uploading to video conferencing service 450 operating on the Internet or another network 405.

The video access point device 410 suitably includes processing hardware such as a microprocessor 411, memory 412 and input/output interfaces 413 (including a suitable USB or other interface to the external storage 420). The example illustrated in FIG. 4 shows video access point device 410 also including a wireless access point 415, where the wireless access point 415 includes processing logic to implement an IEEE 802.11, 802.14 or other wireless protocol for communicating with any number of video capture devices 460A-F though an antenna 418. These video capture devices 460A-F can suitably include a variety of different types of devices, including mobile phones 462, tablets, laptops 463 or similar devices executing a video capture application 465, as desired. Video capture devices 460A-F could also include one or more conventional video cameras 464 that interact with video access point device 410 via an interface device that receives DVI or other video inputs and transmits the received video to the video access point device 410 via Wi-Fi, Bluetooth or other wireless network, as appropriate. Other embodiments could facilitate communications with any other types of video capture devices in any other suitable manner.

Video access point device 410 also suitably includes a controller 414 and encoder 416. Controller 414 and/or encoder 416 may be implemented as software logic stored in memory 412 and executing on processor 411 in some embodiments. Specifically, controller 414 may be implemented as a control application executing on processor 211, for example. Other embodiments may implement the various functions and features using hardware, software and/or firmware logic executing on other components, as desired. Encoder 416, for example, may be implemented using a dedicated video encoder chip in some embodiments. It should also be noted that in equivalent embodiments the encoding and access point functions of video access point device 410 may be provided in two separate devices with separate chassis and hardware, as desired.

In accordance with the embodiments described herein the video access point device 410 facilitates the incorporation of one or more remotely captured video streams from video capture devices 460A-F into an output video stream for use in video conferencing. Specifically, the video access point device 410 provides for the use of a dynamically configurable time clock delay 435 to generate an output video stream with a relatively low latency suitable for use in video conferencing.

More specifically, the use of dynamically configurable time clock delay 435 allows one or more input video streams to be generated by one or more remote video capture devices 160A-F, transmitted to the video access point device 410, and selectively utilized at the video access point device 410 to generate an output video stream with relatively low latency suitable for video conferencing. This low latency video stream can then be transmitted via network 405 to other members of the video conference via a video conferencing service 450 or other equivalent technique.

In one embodiment the video access point device 410 includes a system time clock that is used to synchronize the input video streams generated by the plurality of video capture devices 460A-F. In one embodiment, the system time clock is used to periodically generate a timestamp. That timestamp can then be transmitted to the various video capture devices 460A-F, where the timestamp can then be used to encode the input videos streams.

When the input video streams are transmitted from the video capture devices 460A-F to the video access point device 410, the video access point device 410 will synchronize the input video streams using the encoded timestamps and the system time clock. In one embodiment a plurality of input video streams generated by a plurality of video captures devices 460A-F are received at a video access point device 410. A plurality of measures of video latency is then calculated, with each of the measures of video latency corresponding to one of the plurality of input video streams received at the video access point device 410. A time clock delay 435 is then implemented based at least in part on the plurality of measures of video latency. A conferencing video stream is then generated from the received input video streams using the time clock delay 435.

In such an embodiment the use of the time clock delay 435 implemented based at least in part on the plurality of measures of video latency can provide several distinct improvements. Specifically, by basing the time clock delay 435 at least in part on the measures of video latency the time clock delay can be dynamically adjusted to provide a relatively low latency suitable for video conferencing. Specifically, as the measures of video latency of the input video streams received from the video capture devices change over time, the time clock delay 435 can be adjusted accordingly. This facilitates the generation of an output video stream by the video access point device 410 with minimized latency. Thus, the output video stream can be generated to include all or part of multiple input video streams generated by one or more remote video capture devices while still providing a relatively low latency suitable for video conferencing.

In various embodiments, video access point device 410 operates in response to user inputs supplied by the control device 430. Control device 430 can be implemented with any sort of computing device that includes a processor 431, memory 432 and input/output interfaces 433. Various embodiments could implement control device 430 as a tablet computer, mobile phone, laptop computer or other computing system. In each case the control device 430 may be implemented as a device that executes one or more applications for controlling the functions of video production system 400.

In a typical implementation control device 430 is configured to interact with video access point device 110 directly using a wireless protocol (e.g., Wi-Fi) although a connection through any other network (e.g., network 405) could equivalently be used. Other embodiments may use any other network configuration desired, including any number of additional or alternate networks or other data links.

The example illustrated in FIG. 4 shows an interface 440 for a control application. The interface 440 displays a plurality of input video feeds received from some or all of the video capture devices 460A-F. Furthermore, the interface 440 allows a user to select one or more of the input video feeds to encode into the output video feed. The interface 440 also includes a preview window to display a preview video feed. Interface 440 may include other displays to control other behaviors or features of video production system 400, as desired. In the illustrated example interface 440, including the input video feed windows and preview windows are all displayed on one display, albeit in separate portions of the display. In practice, however, the various elements of interface 440 may equivalently be presented on multiple separate screens for larger presentation or ease of viewing. Interface 440 could be equivalently presented in a dashboard or similar view that presents system or device status information, as desired. Again, the presentation and appearance of the interface 440 may be very different in other embodiments, and may incorporate any different types of information or content arranged in any manner.

In operation, then, a user acting as a video producer or other user would use interface 440 to view the various video feeds that are available from one or more video capture devices 460A-F as provided by video access point device 410. One or more selected video feeds received from the video access point device are displayed in the preview window. The video access point device 410 suitably composites or otherwise encodes the selected video in an appropriate format for eventual viewing or distribution, e.g., via an Internet or video conferencing service 450.

In one embodiment the interface 440 is implemented with a touch screen. In such an embodiment the touch screen can display both the video feeds (e.g., input video feeds and preview video feed).

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process, comprising:
    generating shared timestamps using a system clock of a first device;
    transmitting the shared timestamps from the first device to a first video-capture device and a second video-capture device;
    receiving, by the first device, a first video stream from the first video-capture device and a second video stream from the second video-capture device,
        wherein the first video stream is encoded by the first video-capture device to include the shared timestamps,
        wherein the second video stream is encoded by the second video-capture device to include the shared timestamps;
    calculating a first video latency based on a difference between the shared timestamps encoded with first video stream and first current values of the system clock when the shared timestamps are received with the first video stream,
        wherein the first video latency includes a first time to transmit a shared timestamp, a second time to encode the first video stream with the shared timestamp, and a third time to receive the first video stream encoded using the shared timestamp;
    calculating a second video latency based on a difference between the shared timestamps encoded with second video stream and second current values of the system clock when the shared timestamps are received with the second video stream; and
    updating a time-clock delay based on the first video latency and the second video latency to synchronize the first video stream and second video stream in an output video.

2. The automated process of claim 1, wherein the updating the time-clock delay comprises:
    determining a maximum video latency from the first video latency and the second video latency; and
    implementing the time-clock delay based at least in part on the maximum video latency.

3. The automated process of claim 2, wherein the updating the time-clock delay further comprises adding a margin value to the maximum video latency to determine the time-clock delay.

4. The automated process of claim 2, wherein the updating the time-clock delay further comprises setting the time-clock delay to a value less than or equal to a maximum time-clock delay.

5. The automated process of claim 1, further comprising calculating a second measure of video latency for the first video stream using the shared timestamp encoded with the first video stream.

6. The automated process of claim 1, wherein the calculating the first video latency comprises measuring an amount of video latency for a predetermined percentage of packets of the first video stream arriving at the first device.

7. The automated process of claim 1, further comprising generating the output video by applying the time-clock delay to the system clock on the first device.

8. The automated process of claim 1, wherein the updating the time-clock delay based on the first video latency and the second video latency comprises:
- updating the first video latency in response to the shared timestamps returning with the first video stream capturing a first participant in a video conference;
- updating the second video latency in response to the shared timestamps returning with the second video stream capturing a second participant in the video conference; and
- updating the time-clock delay during the video conference based on the updated first video latency and the updated second video latency.

9. An automated process, comprising:
- generating shared timestamps using a system clock of a first device;
- transmitting the shared timestamps from the first device to a plurality of video-capture devices;
- receiving, by the first device, a first video stream from a first video-capture device of the video-capture devices, wherein the first video stream is encoded by the first video-capture device to include the shared timestamps;
- calculating a first video latency based on the shared timestamps encoded with first video stream, wherein the first video latency is dynamically updated based on a difference between the shared timestamps and current values of the system clock when the shared timestamps are returned to the first device,
  - wherein the first video latency includes a first time to transmit a shared timestamp, a second time to encode the first video stream with the shared timestamp, and a third time to receive the first video stream encoded using the shared timestamp;
- calculating a second video latency based on the shared timestamps encoded with a second video stream received from a second video-capture device of the video-capture devices; and
- adjusting a time-clock delay based on the first video latency and the second video latency to generate an output video.

10. The automated process of claim 9, wherein the adjusting the time-clock delay comprises:
- determining a maximum video latency from the first video latency and the second video latency; and
- implementing the time-clock delay based at least in part on the maximum video latency.

11. The automated process of claim 10, wherein the adjusting the time-clock delay further comprises adding a margin value to the maximum video latency to determine the time-clock delay.

12. The automated process of claim 10, further comprising generating the output video by applying the time-clock delay to the system clock on the first device.

13. A video device comprising a processor in communication with a non-transitory memory configured to store instructions that, when executed by the video device, cause the video device to perform operations, the operations comprising:
- generating shared timestamps using a system clock of a first device;
- transmitting the shared timestamps from the first device to a plurality of video-capture devices;
- receiving, by the first device, a first video stream from a first video-capture device of the video-capture devices, wherein the first video stream is encoded by the first video-capture device to include the shared timestamps;
- calculating a first video latency based on the shared timestamps encoded with first video stream, wherein the first video latency is dynamically updated based on a difference between the shared timestamps and current values of the system clock when the shared timestamps are returned to the first device,
  - wherein the first video latency includes a first time to transmit a shared timestamp, a second time to encode the first video stream with the shared timestamp, and a third time to receive the first video stream encoded using the shared timestamp;
- calculating a second video latency based on the shared timestamps encoded with a second video stream received from a second video-capture device of the video-capture devices; and
- adjusting a time-clock delay based on the first video latency and the second video latency to generate an output video.

14. The video device of claim 13, wherein the adjusting the time-clock delay comprises:
- determining a maximum video latency from the first video latency and the second video latency; and
- implementing the time-clock delay based at least in part on the maximum video latency.

15. The video device of claim 14, wherein the adjusting the time-clock delay further comprises adding a margin value to the maximum video latency to determine the time-clock delay.

16. The video device of claim 14, wherein the adjusting the time-clock delay further comprises setting the time-clock delay to a value less than or equal to a maximum time-clock delay.

17. The video device of claim 16, wherein the maximum time-clock delay is selected from a plurality of predetermined maximum time-clock delay parameters based on a selected latency mode.

18. The video device of claim 13, wherein the operations further comprise calculating a second measure of video latency for the first video stream using the shared timestamp encoded with the first video stream.

19. The video device of claim 13, wherein the calculating the first video latency comprises measuring an amount of video latency for a predetermined percentage of packets of the first video stream arriving at the first device.

20. The video device of claim 13, wherein the operations further comprise generating the output video by applying the time-clock delay to the system clock on the first device.

* * * * *